United States Patent
Lamp et al.

(10) Patent No.: US 6,326,543 B1
(45) Date of Patent: Dec. 4, 2001

(54) SELF-SEALING ACCESSIBLE CONTAINER

(75) Inventors: Robert James Lamp, Chandler; James Lee Isbell, Phoenix, both of AZ (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/413,978

(22) Filed: Oct. 7, 1999

(51) Int. Cl.[7] .................................................. H02G 3/08
(52) U.S. Cl. .............................. 174/52.1; 174/50; 429/99
(58) Field of Search .............................. 174/52.1, 50, 66, 174/67, 52.2; 220/3.8, 241; 429/99, 100, 163

(56) References Cited

U.S. PATENT DOCUMENTS

| 5,126,510 | * | 6/1992 | Bauer et al. ........................ 174/52.1 |
| 5,621,189 | * | 4/1997 | Dodds ................................... 174/50 |
| 5,896,277 | * | 4/1999 | Leon et al. .......................... 361/814 |
| 5,933,330 | * | 8/1999 | Beutler et al. ........................ 429/99 |
| 5,955,700 | * | 9/1999 | Slipy et al. ............................ 174/50 |
| 6,071,640 | * | 6/2000 | Robertson, Jr. et al. ............ 429/100 |
| 6,120,932 | * | 9/2000 | Slipy et al. ............................ 429/99 |
| 6,157,545 | * | 12/2000 | Janninck et al. .................... 429/100 |

FOREIGN PATENT DOCUMENTS

| 0685954 | 6/1995 | (EP) | ............................... H04M/1/02 |
| 2240902 | 8/1991 | (GB) | ............................... H04M/1/18 |
| 185720 | 10/1999 | (JP) | ............................... H01M/2/10 |

* cited by examiner

Primary Examiner—Dean A. Reichard
Assistant Examiner—Angel R. Estrada
(74) Attorney, Agent, or Firm—Frank J. Bogacz

(57) ABSTRACT

A portable electronic device (10) is configured to include an accessible container (12) which has an access hatch (16) and a receptacle (18). The hatch (16) and receptacle (18) are each one-piece molded items. The hatch (16) includes a molded supple coating (56) over a molded rigid shell (54). The coating (56) is applied over walls (70) and a shell edge (82). The shell edge (82) is conformingly shaped to match a receptacle edge (28) so that a seal results when the hatch (16) is latched over a receptacle opening (26), with the supple coating (56) between the two edges (82, 28). Latches (20) are integrally formed with the shell (54), and relief notches (84, 86) are formed adjacent to the latches (20) so that a desired latch resilience results. The coating (56) covers the relief notches (84, 86) so that no openings extend into the accessible container (12).

23 Claims, 4 Drawing Sheets

SELF-SEALING ACCESSIBLE CONTAINER

TECHNICAL FIELD OF THE INVENTION

This invention relates to containers which are easily and inexpensively sealed using a small amount of container volume, yet are easily accessed through an access hatch. In addition, this invention relates to containers which are useful as battery compartments in portable electronic devices as well as in other applications.

BACKGROUND OF THE INVENTION

Portable electronic devices, such as cellular telephones, pagers, radios, CD players, tape players, laptop and hand-held computers, and the like, include a variety of electronic components confined within a housing. Often, the housing includes a compartment or container which must be occasionally accessed by the user, but is closed during normal usage. For example a battery compartment and/or a subscriber identity module (SIM) compartment serve as such containers.

A portable electronic device generally needs to go where people go. In other words, a portable electronic device desirably withstands the precipitation, dust and accidental liquid spillage elements that people routinely encounter in daily life. An accessible container which houses electronic parts typically has electrical contacts so that the electronic components, such as a battery or SIM, retained in the accessible container can be in electrical communication with the remaining electrical components of the device. Unfortunately, when such contacts are exposed to the elements, they tend to corrode and/or become less electrically isolated from one another. Accordingly, providers of portable electronic devices and of other products, wish to use containers which are sealed against the elements so that the reliability and usefulness of their products will be extended.

While the art of container-sealing has long been practiced, the ability to obtain suitable seals typically comes at some expense or potential for new problems when following conventional container-sealing practices. For example, sealing techniques that require separate gaskets are unduly expensive for many applications due to the expense of the gasket and cost of assembly. In addition, such techniques are prone to customer dissatisfaction if the gasket is easily lost or difficult to maintain in place while installing an access hatch. Moreover, sealing techniques that require the use of tools or of great force to remove and install the access hatch are unsuitable for many applications where many users may not possess the needed tools or strength required to access the container.

In portable electronic devices, the expenses and potential customer satisfaction problems associated with sealing a container are sufficiently great that sealing is often omitted altogether. Thus, a rigid molded access hatch often attaches as tightly as practical over a rigid molded receptacle at an opening in the receptacle, leaving gaps, holes or cracks into the container at the seam and in the area of latches and hinges. This technique may be adequate for moderate dust protection, but is typically inadequate for heavy dust, precipitation and liquid spillage protection.

In some prior art portable electronic devices, a captive seal is used to protect even against heavy dust, precipitation and liquid spillage. In such devices an access hatch attaches over a receptacle opening, and the receptacle opening is surrounded by an O-ring captured in a channel that has been molded into the receptacle. However, this is an undesirable solution because it requires an extra component (i.e., the O-ring) and extra manual labor for assembly, thereby increasing costs. Moreover, it is an undesirable solution because it consumes too much space, which is at a premium in portable electronic devices. In particular, the formation of a channel to capture an O-ring typically requires the receptacle surrounding the receptacle opening to be wide enough to accommodate twice the thickness of the receptacle wall plus the diameter of the O-ring.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF THE PREFERRED EMBODIMENTS

Figure 1:
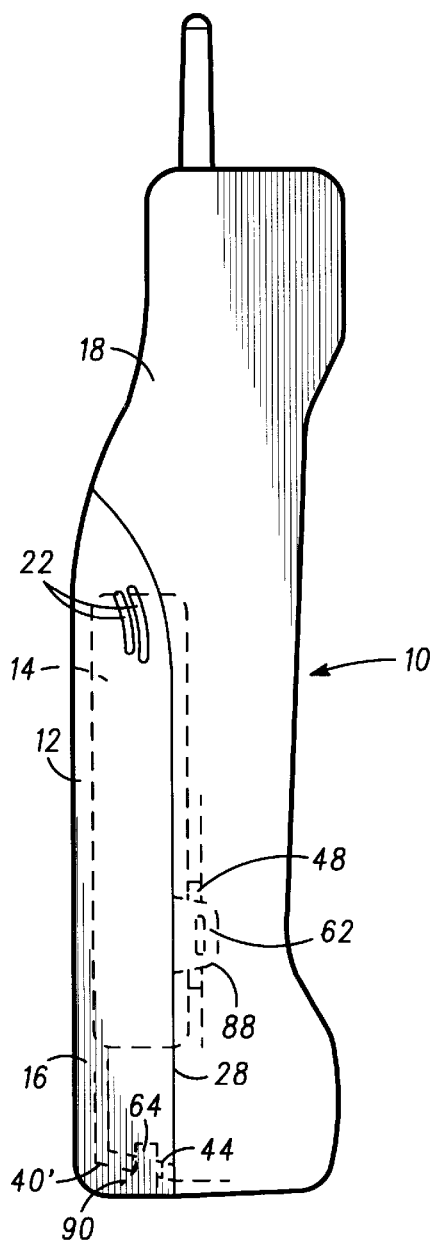
FIG. 1 shows a side view of a portable electronic device which includes an accessible container configured in accordance with the teaching of the present invention.

FIG. 1 shows a side view of a portable electronic device 10 which includes a self-sealing accessible container 12 configured in accordance with the teaching of the present invention. In particular, device 10 is illustrated in the form of a portable cellular telephone, but device 10 may alternatively be configured as a pager, radio, CD player, tape player, laptop or hand-held computer, or other electronic or non-electronic device. Device 10 includes a battery 14 (shown in phantom) sealed within container 12. Battery 14 may be accessed by unlatching and removing an access hatch 16 from a receptacle 18.

The location of latches (discussed below) is indicated by indentations 22, which appear in the outer surface of access hatch 16 in the vicinity of the latches. Indentations 22 provide a visual and tactile indication of where to push to operate the latches so that access hatch 16 may be removed from receptacle 18. Thus, the latches, while hidden from view of the outside of container 12, are nevertheless operable from outside container 12. While FIG. 1 shows only one set of indentations 22, another set of indentations 22 are located at a similar position on the side of access hatch 16 not visible in FIG. 1. Due to a predetermined resilience of the latches, access hatch 16 is installed on receptacle 18 by aligning access hatch 16 at the appropriate position of receptacle 18 and pushing access hatch 16 toward the side of receptacle 18 opposite of where access hatch 16 attaches.

When access hatch 16 is latched to receptacle 18, a seal forms between access hatch 16 and receptacle 18 which is resistant to moisture, dust and liquid spillage.

Figure 2:
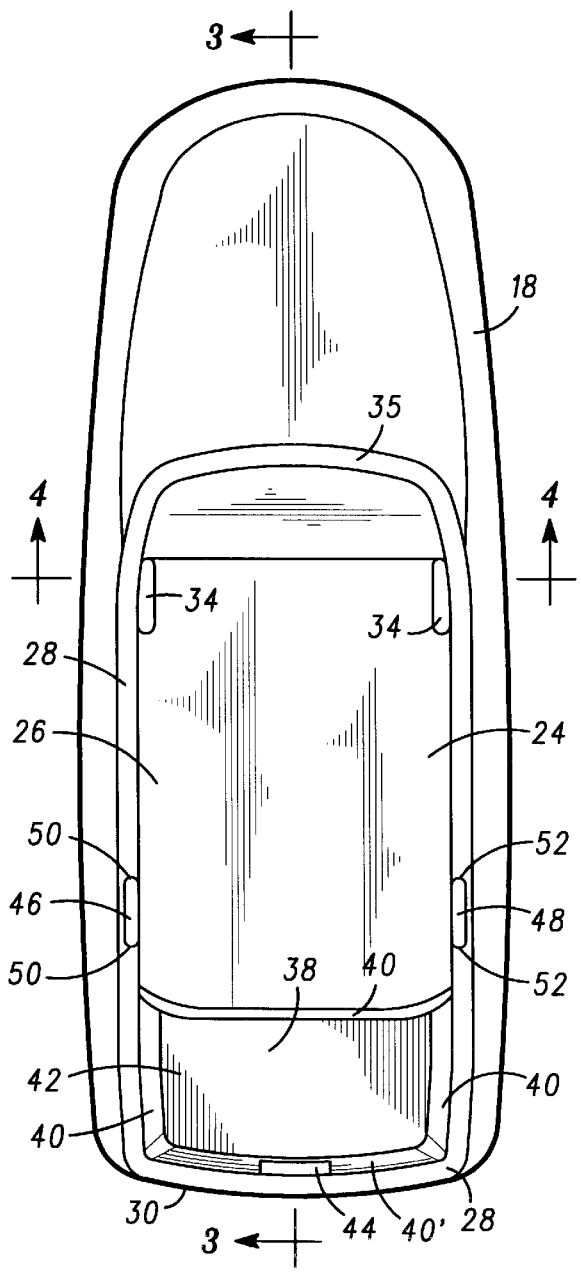
FIG. 2 shows a top view of a receptacle portion of the accessible container.
Figure 4:
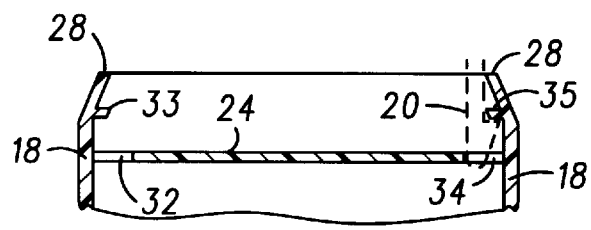
FIG. 4 shows a partial cross-sectional end view of the receptacle, taken at line 4—4 in FIG. 2.
Figure 3:
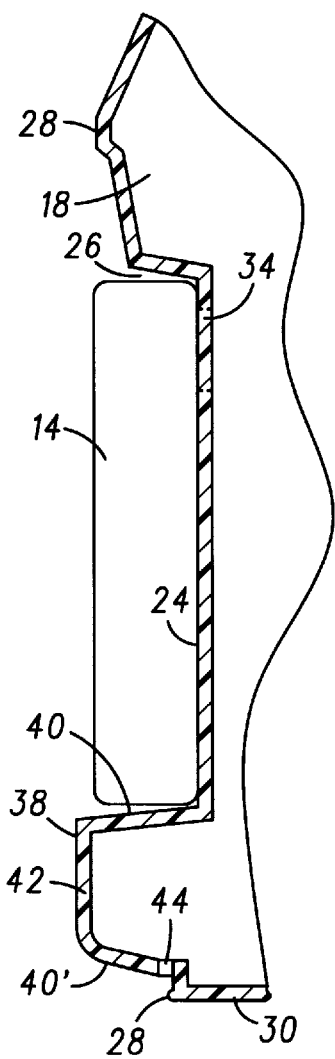
FIG. 3 shows a partial cross-sectional side view of the receptacle, taken at line 3—3 in FIG. 2, and a battery which was omitted from FIG. 2.

FIGS. 2–4 depict details of receptacle 18. In particular, FIG. 2 shows a top view of receptacle 1, FIG. 3 shows a partial cross-sectional side view of receptacle 18, taken at line 3—3 in FIG. 2, and FIG. 4 shows a partial cross-sectional end view of receptacle 18, taken at line 4–4 in FIG. 2. Battery 14 is omitted from FIGS. 2 and 4 but shown in FIG. 3. A single latch 20, which is actually a component of access hatch 16 (FIG. 1), is shown in phantom in FIG. 4. Referring to FIGS. 2–4, receptacle 18 includes a container floor 24 upon which battery 14 rests. A receptacle opening 26 permits access to floor 24. Receptacle opening 26 is surrounded by a receptacle edge 28, which may be shown at an exaggerated thickness in FIG. 2 for the sake of clarity. Access hatch 16 (FIG. 1) forms a seal against receptacle edge 28 in a manner discussed below.

As shown in cross section in FIG. 3 at a lower end 30 of receptacle 18 and in FIG. 4, receptacle edge 28 is desirably configured to exhibit a convex shape when viewed from outside receptacle 18. The convex shape is desirably continued around the entirety of receptacle edge 28. The convex shape tends to concentrate a given amount of pressure applied in latching and maintaining access hatch 16 over receptacle opening 26 in a small area of receptacle edge 28 to increase the amount of force applied to a supple coating, which is discussed below, and to improve the quality of a resulting seal. As an alternative embodiment, a similar convex element can be designed in the sealing edge of access hatch 16 rather than or in addition to receptacle edge 28.

Left and right latch-receiving openings 32 and 34, respectively, in container floor 24 are located proximate an upper end 35 of receptacle opening 26 and adjacent to but within receptacle edge 28. Container floor 24 serves as a latch engagement feature because latches 20 of access hatch 16 extend through openings 32 and 34 and engage inward protruding lips 33 and 35 associated with openings 32 and 34, respectively, to latch access hatch 16 in place over receptacle opening 26. Lips 33 and 35 are molded at an inside of side walls of receptacle 18 in the vicinity of openings 32 and 34. A mating end 36 of a latch 20 is shown in phantom in FIG. 4 in a latched configuration relative to lip 35. The latch engagement feature, which includes left and right latch-receiving openings 32 and 34 in conjunction with lips 33 and 35 is accessible from inside receptacle opening 26 but not from outside of accessible container 12.

A step 38 resides within receptacle opening 26 and inside receptacle edge 28, proximate to lower end 30 of receptacle 18. Step 38 projects outward from container floor 24 and is formed from upright step walls 40 and a step roof 42 positioned over and connecting step walls 40. Step walls 40 may appear to have an exaggerated inward taper in FIG. 2 to clarify the view of a pivot notch 44. Access hatch 16 (FIG. 1) fits over step roof 42 when latched to receptacle 18. Step 38 provides stability and helps guide access hatch 16 into position.

Pivot notch 44 appears in a step wall 40' located closest to and roughly parallel to lower end 30 of receptacle 18. Desirably, step wall 40' is also located immediately inwardly adjacent to receptacle edge 28 and projects roughly perpendicularly outward relative to receptacle edge 28. Pivot notch 44 is centrally located left-to-right in step wall 40' and positioned outwardly adjacent to receptacle edge 28. Pivot notch 44 receives a pivot member (discussed below) of access hatch 16 and helps in aligning and maintaining access hatch 16 into a latched condition with receptacle 18.

Left and right tab-receiving notches 46 and 48, respectively, are positioned adjacent to and inside of receptacle edge 28, slightly upward of step 38. Openings to notches 46 and 48 are desirably positioned vertically at roughly the level of receptacle edge 28. Left and right tab-receiving notches 46 and 48 are respectively surrounded by left and right notch walls 50 and 52. Notches 46 and 48 receive tabs (discussed below) of access hatch 16, cam access hatch 16 forward into a closed position, and help in aligning, tightly sealing, and maintaining access hatch 16 in a latched condition with receptacle 18.

Figure 5:
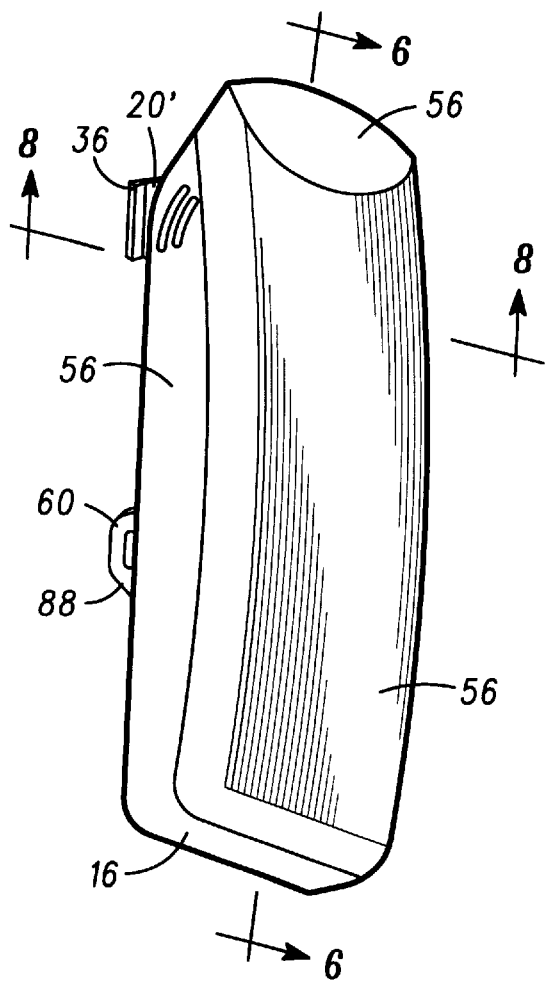
FIG. 5 shows a perspective view of an access hatch portion of the accessible container.
Figure 6:
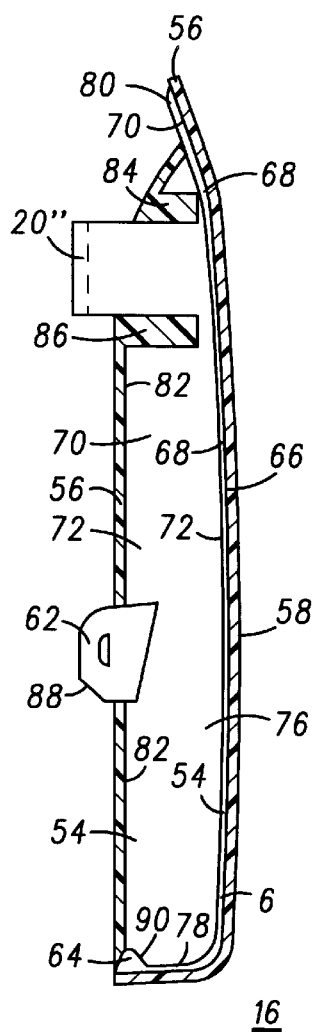
FIG. 6 shows a cross-sectional side view of the access hatch, taken at line 6—6 in FIG. 5.
Figure 7:
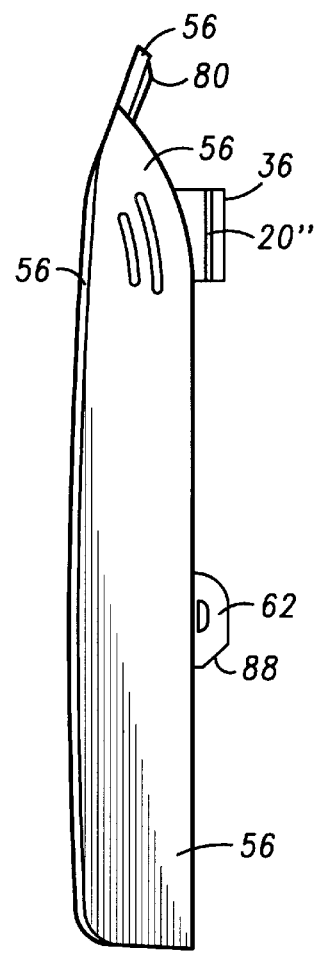
FIG. 7 shows a side view of the access hatch, taken at line 7—7 in FIG. 5.
Figure 8:
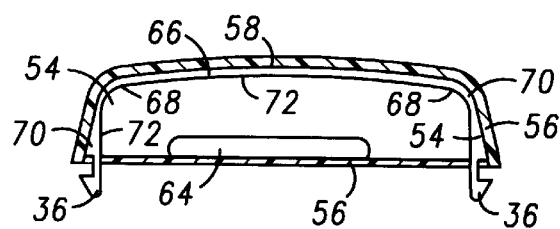
FIG. 8 shows a cross-sectional end view of the access hatch, taken at line 8—8 in FIG. 5.
Figure 9:
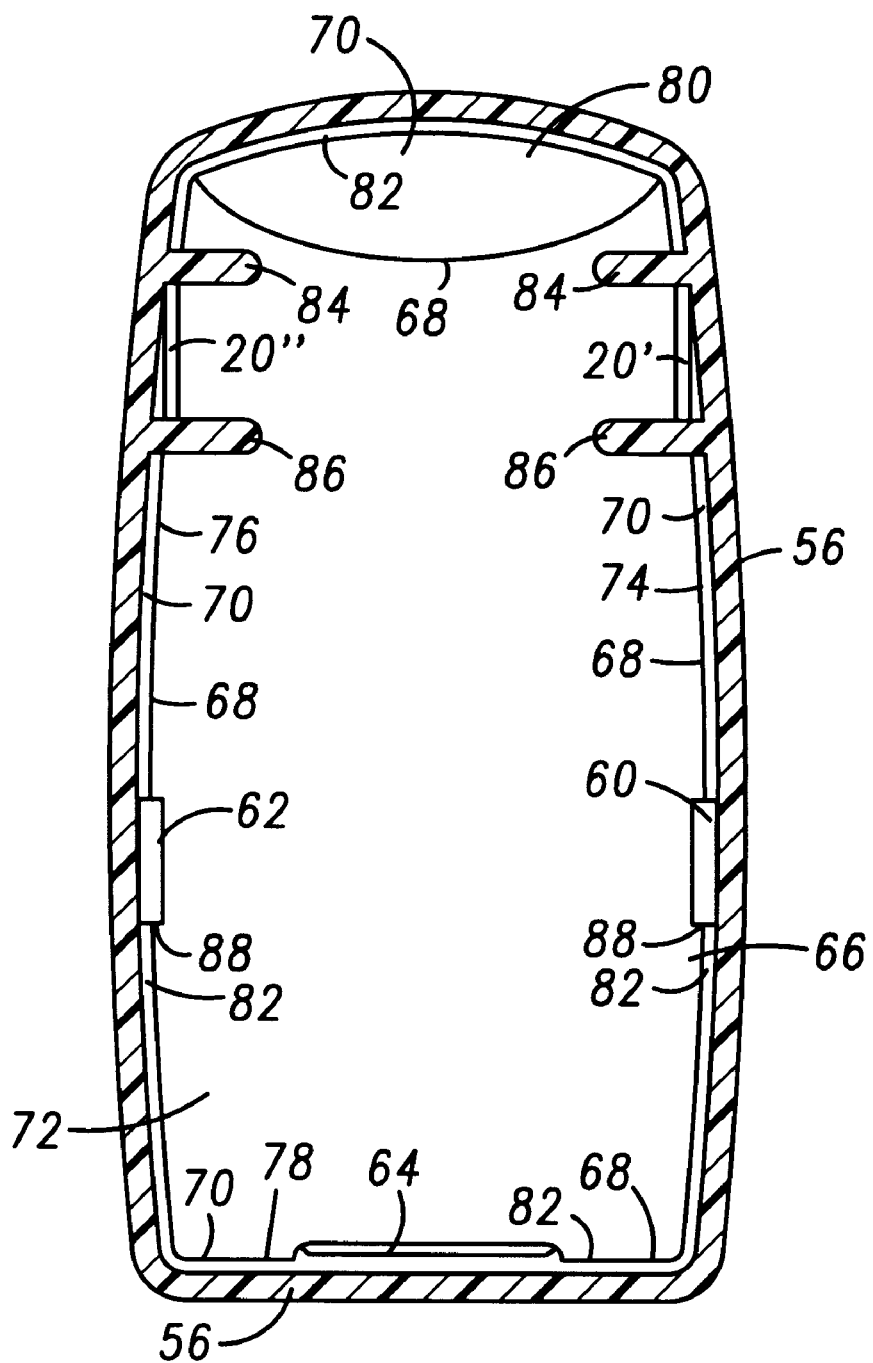
FIG. 9 shows a bottom view of the access hatch.

FIGS. 5–9 show various views of access hatch 16. In particular, FIG. 5 shows a perspective view of access hatch 16, FIG. 6 shows a cross-sectional side view of access hatch 16, taken at line 6—6 in FIG. 5, FIG. 7 shows a side view of access hatch 16, taken at line 7—7 in FIG. 5, FIG. 8 shows a cross-sectional end view of access hatch 16, taken at line 8—8 in FIG. 5, and FIG. 9 shows a bottom view of access hatch 16.

Referring to FIGS. 5–9, access hatch 16 includes a rigid shell 54, a coating 56 substantially covering an exterior surface 58 of shell 54, left and right latches 20' and 20", left and right tabs 60 and 62, and a pivot member 64. Shell 54 is desirably formed by molding a resinous material which cools to a relatively hard and rigid substance. Latches 20 and tabs 60 and 62 are desirably molded with shell 54 into an integrated unit made of this resinous material.

In the preferred embodiment, coating 56 is also formed from a resinous material by molding over shell 54 using a conventional two-shot or overmolding process. The resinous materials used for shell 54 and coating 56 are desirably compatible so that coating 56 bonds to exterior surface 58 of shell 54. Moreover, the material selected for coating 56 is less rigid, or more supple, than the material used for shell 54. Desirably, coating 56 is sufficiently supple to form an effective seal when clamped against receptacle edge 28 (FIG. 2). In one example, coating 56 is formed from Monprene™, which is manufactured by the QST Corporation, and shell 54 is formed from a polycarbonate ABS blend. However, those skilled in the art can select different materials which achieve the goals and objects of the present invention.

Shell 54 includes a base 66, which roughly overlies receptacle opening 26 (FIG. 2) when latched to receptacle 18. Base 66 is surrounded by a base periphery 68, from which a shell wall 70 extends at an angle. In the preferred embodiment, wall 70 extends around the entirety of periphery 68, causing shell 54 to exhibit a three-dimensional shape. Exterior surface 58 and an interior surface 72 of shell 54 appear on base 66 and on wall 70. Also in the preferred embodiment, wall 70 extends roughly perpendicularly away from base 66 at left and right sides 74 and 76 of shell 54 and at a lower side 78 of shell 54, but at a much smaller angle at an upper side 80 of shell 54.

A shell edge 82 appears at the end of wall 70 distally located from base 66. Edge 82 surrounds shell 54 on wall 70 and extends a distance substantially equivalent to an average thickness for shell 54 from exterior surface 58 to interior surface 72. In the preferred embodiment, this thickness is substantially the same thickness as receptacle edge 28 (FIG. 2). Accordingly, receptacle and shell wall thickness need not be increased to provide a channel or other feature needed to captivate an O-ring, and increased space is available within device 10 (FIG. 1) as a result. In addition, shell edge 82 is shaped to conform to the shape of receptacle edge 28 in three dimensions so as to accommodate a sealing engagement between access hatch 16 and receptacle 18 (FIGS. 1–4).

Coating 56 is configured to extend beyond shell 54 at shell edge 82. Preferably, coating 56 wraps around exterior surface 58 onto edge 82, as shown in FIGS. 8 and 9, which actually show coating 56 over only the exterior portion of edge 82. It is this portion of coating 56 which extends beyond shell 54 at shell edge 82 that acts as a gasket in forming a seal with receptacle edge 28. In the preferred embodiment, edge 82 and conformal coating 56 are substantially flat. Thus, the convex shape of receptacle edge 28 discussed above and shown in FIG. 3 causes the actual contact point between receptacle edge 28 and coating 82 to be a thin line surrounding receptacle opening 26 (FIG. 2), but this is not a requirement of the present invention.

Latches 20 extend down from inside edge 82 and extend beyond shell 54 at edge 82. In particular, latches 20 are hook-shaped, and mating end 36 of latches 20 are distally located relative to shell 54 and jut or otherwise point in an outward direction relative to shell 54. Latches 20 also exhibit a tapered portion at mating end 36 which causes latches to deflect inward as access hatch 16 is latched into place over receptacle opening 26. The deflection occurs as latches 20 pass through latch-receiving openings 32 and 34 (FIGS. 2 and 4). The natural resilience of latches 20, being integrally formed with shell 54 from the same rigid material, then causes latches 20 to deflect outward as soon as mating ends 36 pass through latch-receiving openings 32 and 34. At this point, mating ends 36 have engaged lips 33 and 35 of receptacle 18 (FIG. 4).

In order for latches 20 to exhibit effective amounts of resilience, fore and aft relief notches 84 and 86 are formed adjacent to each of latches 20. The distances for which notches 84 and 86 extend determine the resilience of latches 20 in a manner known to those skilled in the art. Generally, longer notches 84 and 86 lead to reduced resilience, all other factors remaining unchanged. Complete elimination of notches 84 and 86 would prove the stiffest latch design for a given access hatch 16. However, coating 56 covers substantially the entirety of notches 84 and 86. By covering relief notches 84 and 86, leak paths otherwise associated with molded latch features are blocked, thereby enabling a sealing engagement between access hatch 16 and receptacle 18 (FIG. 1). Moreover, the covering of notches 84 and 86 by coating 56 increases the resilience of latches 20 more than the resilience which would otherwise be exhibited by notches which extend for a given distance. Accordingly, notches 84 and 86 are extended for a greater distance than would be required without coating 56 because coating 56 increases the reduced resilience otherwise resulting.

As is evident from the above-presented discussion, molded latch features, such as latches 20, notches 84 and 86, container floor 24 (FIG. 2), lips 33 and 35 (FIG. 4) and latch-receiving openings 32 and 34 (FIGS. 2 and 4) for accessible container 12 (FIG. 1) are located inside receptacle 18 and access hatch 16. When latched, pressure is exerted which clamps coating 56 between shell edge 82 and receptacle edge 28 so that a sealing engagement is maintained. Because these latch features are on the interior, no leak paths are present to the outside. Moreover, latches 20 are nevertheless operable from outside accessible container 12 for the removal of access hatch 16 by pressing inward at indentations 22.

Tabs 60 and 62 are located inside shell edge 82 to mate with tab-receiving notches 46 and 48 of receptacle 18 (FIG. 2). Thus, tabs 60 and 62 are located inwardly adjacent to shell edge 82 and extend beyond shell 54 at edge 82. When access hatch 16 is latched in place on receptacle 18, tabs 60 and 62 keep wall 70 of shell 54 from bowing outward if device 10 (FIG. 1) is squeezed, and tabs 60 help maintain proper alignment of access hatch 16 to receptacle 18 during the latching operation.

A lower side 88 of each of tabs 60 and 62 is tapered. The taper is configured so that as access hatch 16 is latched into place over receptacle opening 26 and tabs 60 and 62 respectively engage notches 46 and 48 (FIG. 1), movement of access hatch 16 and receptacle 18 toward each other urges upward lateral movement of access hatch 16 relative to receptacle 18. However configured, when latched, the operation of sides 88 of tabs 60 and 62 respectively against notch walls 50 and 52 (FIG. 2) particularly causes pressure to be exerted by wall 70 and shell edge 82 against receptacle edge 28 at upper side 80 of access shell 16.

Pivot member 64 extends inwardly from wall 70 of shell 54 at lower side 78 of shell 54. Moreover, pivot member 64 is positioned on wall 70 in the preferred embodiment roughly adjacent to shell edge 82. Pivot member 64 is configured to engage pivot notch 44 of receptacle 18 (FIGS. 2–3). Desirably, in order to attach access hatch 16 to receptacle 18, pivot member 64 is first inserted into pivot notch 44, whereupon access hatch 16 is automatically properly aligned from left-to-right, relative to the views of FIGS. 2 and 9. Then, access hatch 16 is simply rotated around pivot member 64 until latching occurs.

In one embodiment, pivot member 64 exhibits a tapered or curved upper surface 90. The shape of surface 90 helps in stabbing pivot member 64 into pivot notch 44. Moreover, this shape causes the upward lateral movement of access hatch 16, which in turn is caused by sides 88 of tabs 60 and 62 working against notch walls 50 and 52 as discussed above, to urge shell edge 82 toward receptacle edge 28 in the vicinity of pivot member 64 for a reliable sealing engagement. Although pivot member 64 is shown as a single member, it may alternatively be constructed of multiple elements.

In summary, the present invention provides an improved self-sealing accessible container. A seal is formed without requiring use of a separate gasket or use of a thick receptacle which includes a channel for capturing an O-ring. A self-sealing accessible container in accordance with the teaching of the present invention is inexpensive to produce because the access hatch is a one-piece molded item and the receptacle is a one-piece molded item. No separate hinge or latching mechanisms or components are necessary. Neither tools nor a great amount of strength are required to remove and attach the access hatch. In addition, a self-sealing accessible container in accordance with the teaching of the present invention is suitable for use as a portion of a housing for a portable electronic device because the container is effective in sealing a battery compartment at low cost and needs only a small volume of space to realize a seal.

Although the preferred embodiments of the present invention have been illustrated and described in detail, it will be readily apparent to those skilled in the art that various modifications and equivalents may be made therein without departing from the spirit of the invention or from the scope of the appended claims. For example, additional features, such as strengthening ribs and design elements, may be included in the molded components discussed herein. Certainly the precise shapes and relative sizes illustrated herein can be greatly altered by those skilled in the art in forming equivalent containers. In addition, those skilled in the art will appreciate the directional terms used herein, such as top, bottom, front, back, left, right, upper, lower, fore and aft, impose no limitation whatsoever on the present invention, and instead refer only to the views and orientations illustrated in the figures.

What is claimed is:

1. A self-sealing accessible container comprising:
   a receptacle having an opening surrounded by a receptacle edge and having a latch engagement feature accessible from inside said opening;
   a shell formed of a first material and having an exterior surface, an interior surface, and a shell edge extending between said exterior and interior surfaces, said shell being shaped so that said shell edge substantially conforms to said receptacle edge;
   a latch configured to engage said latch engagement feature, said latch being positioned inside said shell edge, and operable from outside said shell;
   a coating of a second material bonded to said shell and extending beyond said shell at said shell edge;
   wherein said shell is more rigid than said coating, and said coating forms a seal with said receptacle edge when said latch engages said latch engagement feature;
   said latch is integrally formed with said shell from said first material;
   said shell has a relief notch adjacent to said latch to impart a predetermined amount of resilience to said latch; and
   said coating substantially covers an entirety of said relief notch and at least a portion of said latch.

2. A self-sealing accessible container as claimed in claim 1 wherein:
   said accessible container is a portion of a housing for a portable electronic device; and
   said accessible container additionally comprises a battery which is sealed within said accessible container of said housing of said portable electronic device when said shell is latched over said receptacle opening.

3. A self-sealing accessible container as claimed in claim 1 wherein said first and second materials are resins, and said second material is more supple than said first material.

4. A self-sealing accessible container as claimed in claim 1 wherein said shell is molded from a first resinous material and said coating is molded from a second resinous material, said second material being more supple than said first material.

5. A self-sealing accessible container as claimed in claim 1 wherein said coating is bonded to at least a portion of said shell edge.

6. A self-sealing accessible container as claimed in claim 5 wherein one of said shell edge and said receptacle edge exhibits a convex shape relative to another of said shell edge and said receptacle edge.

7. A self-sealing accessible container as claimed in claim 1 wherein said coating is molded to substantially cover said exterior surface of said shell and at least a portion of said shell edge.

8. A self-sealing accessible container as claimed in claim 1 wherein:
   said shell exhibits an average thickness;
   said shell edge extends between said exterior and interior surfaces for substantially said average thickness; and
   said receptacle edge exhibits substantially said average thickness.

9. A self-sealing accessible container as claimed in claim 1 wherein said shell has a three-dimensional shape in which said interior and exterior surfaces appear on a base of said shell and on a wall of said shell, said wall extending from said base at an angle, and said shell edge appearing on said wall.

10. A self-sealing accessible container as claimed in claim 9 wherein said shell base has a periphery and said shell wall extends substantially around an entirety of said periphery of said shell base.

11. A self-sealing accessible container as claimed in claim 10 wherein:
    said latch is configured as a hook which extends away from said shell base beyond said shell edge; and
    said latch engagement feature is an inwardly protruding lip with which said latch engages to maintain said shell edge and said receptacle edge in sealing engagement with one another.

12. A self-sealing accessible container as claimed in claim 11 wherein:
    said wall has first and second opposing sides;
    said latch is a first latch and resides at said first side;
    said inwardly protruding lip is a first inwardly protruding lip; and
    said accessible container additionally comprises a second latch positioned inside said shell edge at said second side, said second latch being configured as a hook which extends away from said shell base beyond said shell edge, being operable from outside said shell, and being configured to engage a second inwardly protruding lip.

13. A self-sealing accessible container as claimed in claim 10 wherein a mating end of said latch extends away from said shell base beyond said shell edge and juts outwardly relative to said shell.

14. A self-sealing accessible container as claimed in claim 1 wherein:
    said relief notch is a first relief notch;
    said shell has a second relief notch adjacent to said latch; and
    said coating substantially covers an entirety of said second relief notch and at least a portion of said latch.

15. A self-sealing accessible container as claimed in claim 1 wherein:
    said receptacle has a notch-wall surrounding a notch which is positioned inside said receptacle edge; and
    said container additionally comprises a tab positioned inside said shell edge and extending away from said shell into said notch, wherein at least one of said tab and said notch-wall are tapered to urge lateral movement of said shell relative to said receptacle when said shell is latched over said receptacle opening.

16. A self-sealing accessible container as claimed in claim 1 wherein:
    said receptacle has a pair of notch-walls respectively surrounding a pair of notches, wherein each of said notches is positioned inside said receptacle edge; and
    said container additionally comprises a pair of tabs, each of which are inside said shell edge and each of which extend away from said shell into one of said notches, wherein said tabs and said notch-walls are mutually configured to urge lateral movement of said shell relative to said receptacle when said shell is latched over said receptacle opening.

17. A self-sealing accessible container as claimed in claim 1 wherein:
    said receptacle has an outwardly projecting wall located inside said receptacle edge, said wall having a pivot notch therein; and said container additionally comprises a pivot member extending inwardly from said shell inward of said shell edge, said pivot member being located to engage said pivot notch when said shell edge and said receptacle edge are in sealing engagement with one another.

18. A self-sealing accessible container as claimed in claim 17 wherein at least one of said pivot member and said pivot notch are tapered to urge said shell edge toward said receptacle edge when said shell is latched over said receptacle opening.

19. A self-sealing accessible container comprising:

a receptacle having an opening surrounded by a receptacle edge and having a latch engagement feature accessible from inside said opening;

a shell molded from a first resinous material and having an exterior surface, an interior surface, and a shell edge extending between said exterior and interior surfaces, said shell being shaped so that said shell edge substantially conforms to said receptacle edge;

a latch molded with said shell from said first resinous material and configured to engage said latch engagement feature, said latch being positioned inside said shell edge, and operable from outside said shell, wherein said shell has a relief notch adjacent to said latch to impart a predetermined amount of resilience to said latch; and a coating of a second resinous material which is more supple than said first resinous material, said coating being molded over at least a portion of said shell edge and said relief notch of said shell;

wherein said coating seals said relief notch and forms a seal with said receptacle edge when said latch engages said latch engagement feature.

20. A self-sealing accessible container as claimed in claim 19 wherein said shell has a three-dimensional shape in which said interior and exterior surfaces appear on a base of said shell and on a wall of said shell, said wall extending from said base at an angle, and said shell edge appearing on said wall.

21. A self-sealing accessible container as claimed in claim 20 wherein:

said receptacle has a notch-wall surrounding a receptacle notch which is positioned inside said receptacle edge; and said container additionally comprises a tab molded with said shell inside said shell edge and extending away from said shell into said receptacle notch, wherein at least one of said tab and said notch-wall are tapered to urge lateral movement of said shell relative to said receptacle when said shell is latched over said receptacle opening.

22. A self-sealing accessible container as claimed in claim 20 wherein:

said receptacle has an outwardly projecting wall located inside said receptacle edge, said wall having a pivot notch therein; and said container additionally comprises a pivot member extending inwardly from said shell inward of said shell edge, said pivot member being located to engage said pivot notch when said shell edge and said receptacle edge are in sealing engagement with one another.

23. A self-sealing accessible container portion of a housing for a portable electronic device, said container comprising:

a receptacle having an opening surrounded by a receptacle edge, having a latch engagement feature accessible from inside said opening, having a pair of notch-walls respectively surrounding a pair of receptacle notches, wherein each of said receptacle notches is positioned inside said receptacle edge, and having an outwardly projecting interior wall located inside said receptacle edge, said interior wall having a pivot notch therein;

a battery positioned in said receptacle;

a shell molded from a first resinous material and having a base substantially surrounded by a shell wall which extends from said base at an angle, said shell wall having a shell edge distally located from said base, said shell edge being conformingly shaped to said receptacle edge;

a latch molded with said shell from said first resinous material and configured to engage said latch engagement feature, said latch being positioned inside said shell wall, and operable from outside said shell, wherein said shell wall has a relief notch adjacent to said latch to impart a predetermined amount of resilience to said latch;

a pair of tabs molded with said shell from said first resinous material, wherein each of said pair of tabs is inside said shell wall and each of said pair of tabs extends away from said shell into one of said receptacle notches, wherein said tabs and said notch-walls are mutually configured to urge lateral movement of said shell relative to said receptacle when said shell is latched over said receptacle opening;

a pivot member molded with said shell from said first resinous material, said pivot member extending inwardly from said shell inward of said shell edge, said pivot member being located to engage said pivot notch when said shell is latched over said receptacle opening; and a coating of a second resinous material which is more supple than said first resinous material, said coating being molded over said shell so as to cover at least said relief notch and to engage said receptacle edge when said shell is latched over said receptacle opening.

* * * * *